United States Patent [19]

Ikeda et al.

[11] Patent Number: 5,472,305
[45] Date of Patent: Dec. 5, 1995

[54] SEALED ROTARY FEEDER

[75] Inventors: Sadao Ikeda, Toyota; Makoto Kito, Aichi, both of Japan

[73] Assignee: Toyota Jidosha Kabushiki Kaisha, Japan

[21] Appl. No.: 93,883

[22] Filed: Jul. 20, 1993

[30] Foreign Application Priority Data

Oct. 29, 1992 [JP] Japan .................................. 4-291556
Nov. 4, 1992 [JP] Japan .................................. 4-295231

[51] Int. Cl.$^6$ .................................................. G01F 11/10
[52] U.S. Cl. .............................................. 414/219; 222/368
[58] Field of Search ................................... 414/218, 219, 414/220; 222/368

[56] References Cited

U.S. PATENT DOCUMENTS

| | | | |
|---|---|---|---|
| 2,492,460 | 12/1949 | Botelho ................................... | 414/220 |
| 3,052,383 | 9/1962 | Transeau . | |
| 3,151,784 | 10/1964 | Tailor . | |
| 3,201,007 | 8/1965 | Transeau . | |
| 3,999,905 | 12/1976 | Goloff et al. . | |
| 4,051,212 | 9/1977 | Grigat et al. . | |
| 4,098,649 | 7/1978 | Redker . | |
| 4,142,868 | 3/1979 | Gencsey et al. ........................ | 414/219 |
| 4,155,486 | 5/1979 | Brown . | |
| 4,235,354 | 11/1980 | Aonuma et al. . | |
| 4,496,707 | 1/1985 | Liggett . | |
| 4,784,298 | 11/1988 | Heep et al. ............................ | 222/368 |
| 4,915,265 | 4/1990 | Heep et al. . | |
| 5,215,625 | 6/1993 | Burton . | |

FOREIGN PATENT DOCUMENTS

| | | |
|---|---|---|
| 3940667C1 | 4/1991 | Germany . |
| 33-7337 | 5/1958 | Japan . |
| 55-117438 | 8/1980 | Japan . |
| 55-140528 | 11/1980 | Japan . |
| 58-6819 | 2/1983 | Japan . |
| 63-134421 | 6/1988 | Japan . |
| 3-95027 | 4/1991 | Japan . |
| 3-195634 | 8/1991 | Japan . |
| 280253 | 11/1927 | United Kingdom . |
| 972715 | 8/1964 | United Kingdom . |

OTHER PUBLICATIONS

European Search Report dated Oct. 6, 1993 (3 pages).
Communication dated Oct. 19, 1993 (1 page).

Primary Examiner—Michael S. Huppert
Assistant Examiner—Thomas J. Brahan
Attorney, Agent, or Firm—Finnegan, Henderson, Farabow, Garrett & Dunner

[57] ABSTRACT

An object of this invention is to provide a sealed rotary feeder for use in an apparatus which continuously processes chips made of synthetic resin with a coating under high pressure and temperature without degrading its material strength. The sealed rotary feeder according to this invention consists of a cylindrical casing having a chip inlet on the upper side of said cylindrical casing and a chip outlet on the low side of said cylindrical casing, a rotor in said cylindrical casing, plural blades which are movably inserted into channels radially formed around said rotor, and divide said cylindrical casing into plural baskets, pressing means which press said plural blades against the inner surface of said cylindrical casing, and walls which form said channels are extended at the vicinity of the inner surface of said cylindrical casing.

4 Claims, 17 Drawing Sheets

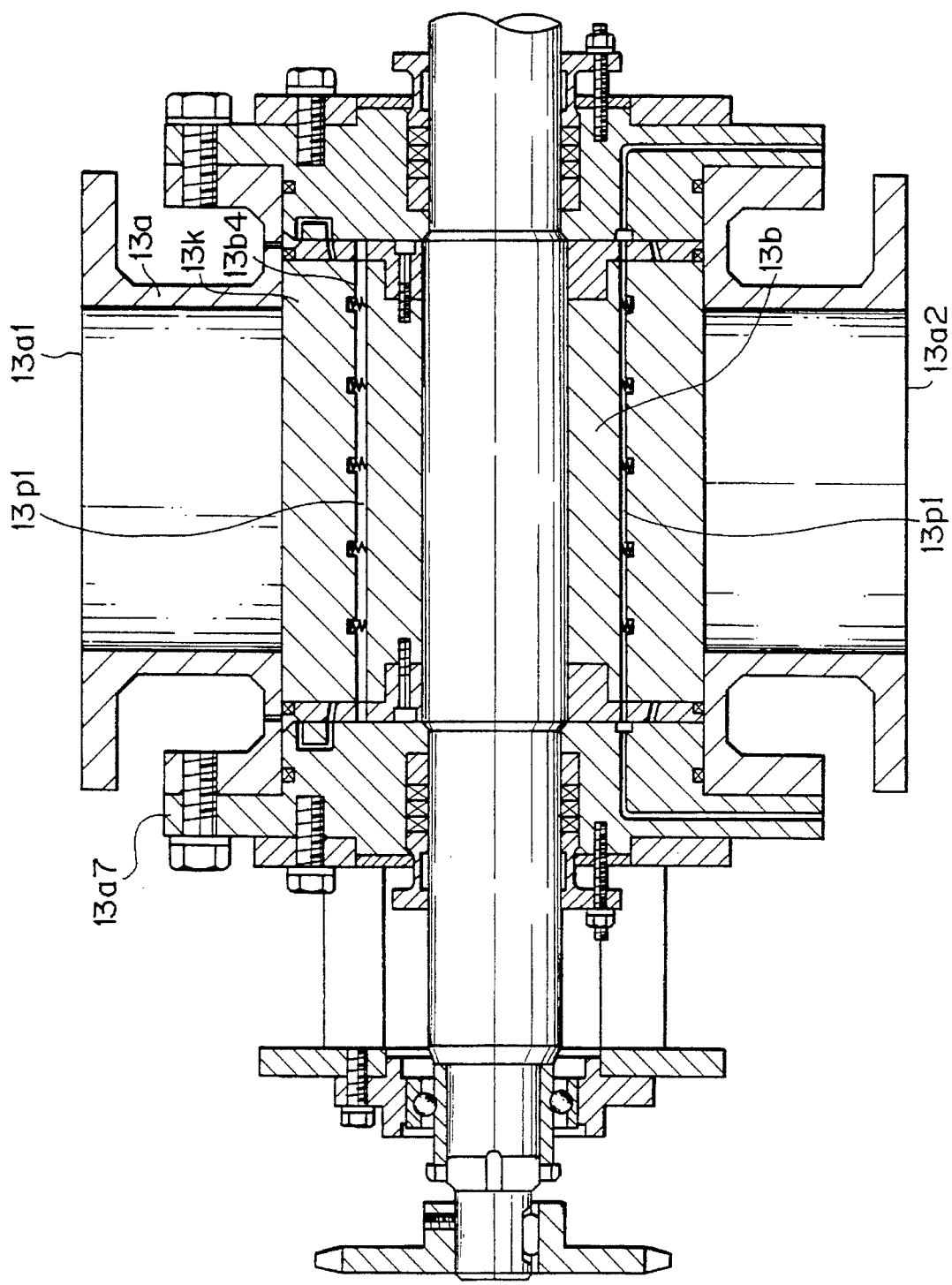

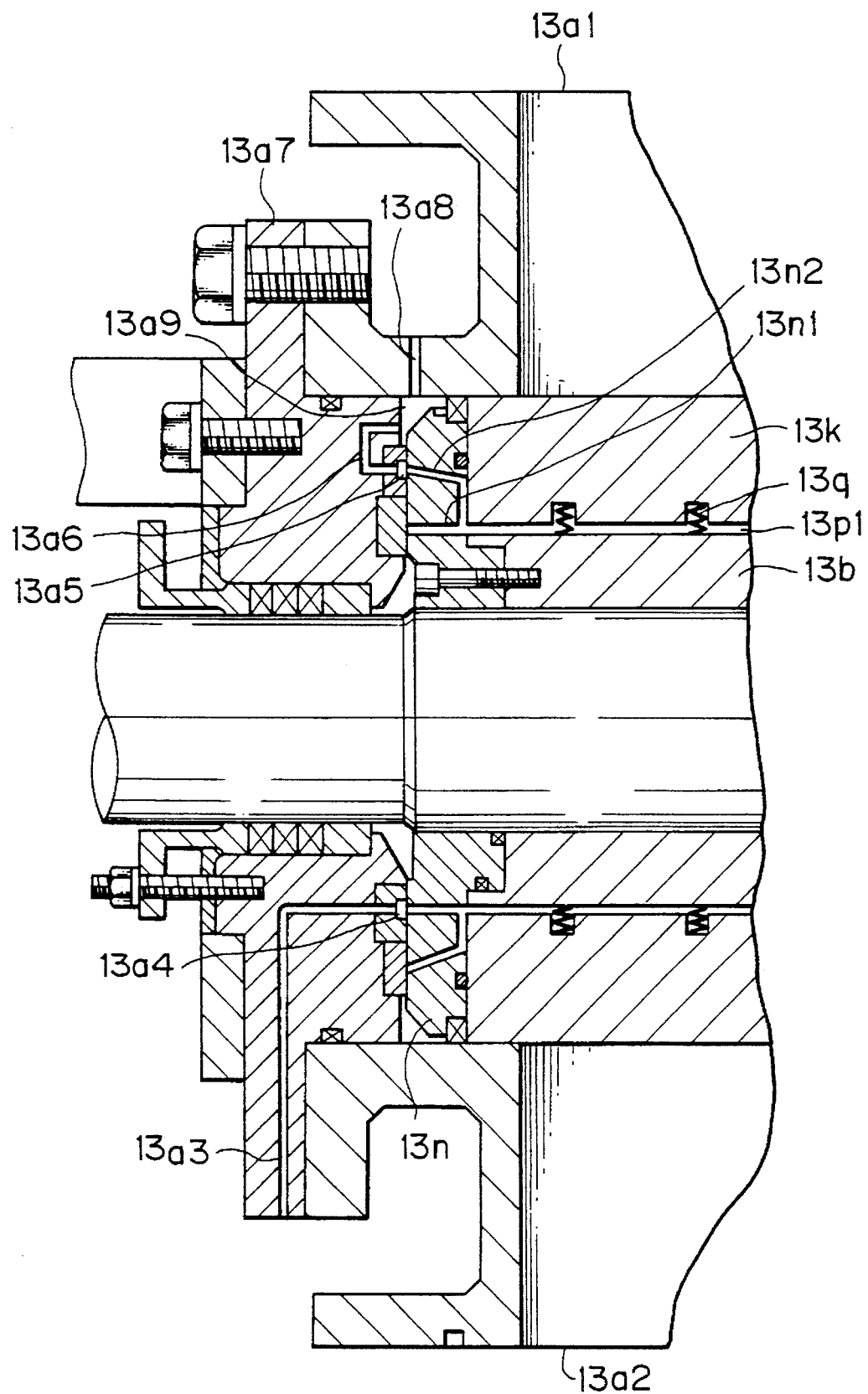

SEALED ROTARY FEEDER

BACKGROUND OF THE INVENTION

1. Field of the Invention

The present invention relates to a rotary feeder, especially it is concerned with a sealed rotary feeder which can withstand a large pressure drop between its upstream and its downstream end.

2. Description of the Prior Art

Recently it has become necessary to reuse waste parts made of synthetic resin, for environmental reasons, and it is general practice to separate waste parts and reuse them as material for new products. It is, furthermore, general practice to coat products with a thermosetting coating to add to the beauty of the products.

In the case of liquefying waste parts with a coating, the thermosetting coating is not decomposed. Therefore, the strength of the material is degraded when synthetic resins containing un-decomposed coatings are reused.

For instance, in cold districts, the strength of bumpers made of synthetic resins containing un-decomposed coatings is lower than that of bumpers made of synthetic resin without the coatings included.

The degradation of material strength can be avoided if the coating is removed, but perfect removal of coating is too difficult. Although coating can be mechanically removed by shotblasting etc., it not only takes a long time but is impossible to perfectly remove the coating when parts have complicated shapes. Mechanical removal, therefore, is unsuitable for mass recycling.

Although removal of the coating with organic acid has been proposed, it causes environmental pollution.

To solve the above-mentioned problem, the present applicant has already proposed a method for recycling synthetic resin parts, that is, the coating thereof is hydrolyzed and kneaded into synthetic resin chips (See Japanese Patent Application No. 3-192431).

The above-mentioned method is a so-called batch process, and is not suitable for continuous recycle.

To hydrolyze synthetic resin chips, it is necessary to continuously supply chips to a hydrolyzing vessel, in which the temperature and pressure thereof are maintained at suitable levels.

Prior art of an apparatus enabling a continuous supply of chips under pressure is disclosed in Japanese Unexamined Utility Model Application (Kokai) 55-117438. In this Prior Art, sealing blades of a rotary feeder are pressed against an inner wall of its casing by springs.

It is necessary, therefore, that the more the pressure difference between the inlet and the outlet of the rotary feeder is increased, the more the spring force to press the sealing blades against the inner wall is increased. This causes damage to the sealing blades. Then the life of the blades may be reduced and frequent maintenance and inspection may be required.

The sealing blades in the Prior Art, furthermore, are only inserted into a channel arranged on a rotor. Then when the supplied chips go into the clearance between the sealing blades and the channel, the sealing effect may be lost.

SUMMARY OF THE INVENTION

Therefore, an object of the present invention is to provide a sealed rotary feeder allowing the use of an apparatus which continuously hydrolyzes chips made of synthetic resin with a coating under high pressure and temperature conditions without degrading the material strength.

To achieve the objects and in accordance with the purpose of the invention, as embodied and broadly described herein, the sealed rotary feeder of this invention comprises a casing having an inner cylindrical surface and a chip inlet intersecting said cylindrical surface at one location, and a chip outlet intersecting said cylindrical surface at a second location removed from said first location, and a rotor installed in said casing within said cylindrical surface, said rotor having plural walls which radially extend outwardly toward the inner cylindrical surface of said casing, a channel formed in the top of each of said plural walls, a blade movably positioned in each said channel, and a pressing means for pressing said blade against the inner cylindrical surface of said casing, and during rotation of said rotor at least two blades between said chip inlet and said chip outlet being simultaneously pressed against the inner cylindrical surface of said casing.

BRIEF DESCRIPTION OF THE DRAWINGS

The present invention will be more clearly understood from the description set forth below with reference to the accompanying drawings.

FIG. 10 is an axial structural drawing of the second embodiment.

FIG. 11 is a partial enlarged axial structural drawing of the second embodiment.

DESCRIPTION OF THE PREFERRED EMBODIMENTS

Figure 1:
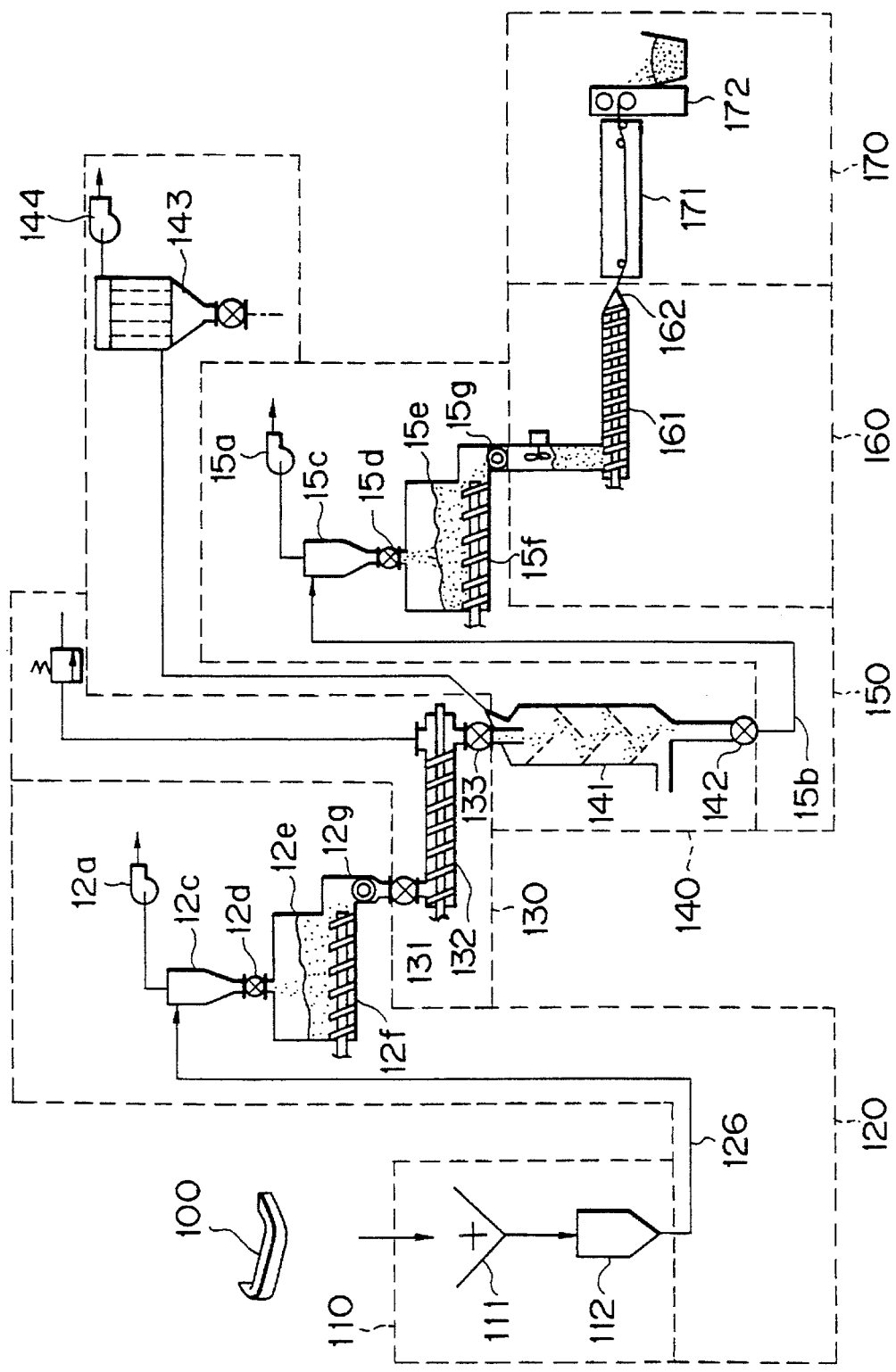
FIG. 1 is a flow-chart of a continuous recycling plant for waste parts made of synthetic resin having a coating thereon.

FIG. 1 is a flow-chart of continuous processing plant for waste parts made of synthetic resin having a coating thereon.

A waste part made of synthetic resin is, for example, a bumper 100 made of polypropylene (hereinafter referred to as PP) with a polyester melamine or a acrylic melamine coating on its surface.

Note, the synthetic resin is not limited to PP, and it may be allowable that the synthetic resin is any one kind of thermoplastic resin such as denaturation polypropylene, polyethylene, ABS resin, AS resin, polyamide resin, polyester resin, polycarbonate resin, polyacetal resin, polyphenylene oxide and denaturation polyphenylene oxide.

And it may also be allowable that the coating is any one kind of coating which can be hydrolyzed and decomposed to a low molecular weight compound, such as a urethane type or an amino resin type.

A crusher 110 consists of a coarse crusher 111 and a fine crusher 112. At first, a bumper 100 with paint film is crushed to standard bars, for example 30 cm length×5 mm width×5 mm thickness by the coarse crusher 111, and is further crushed to chips, for example 5 mm×5 mm 5 mm cubes, by the fine crusher 112.

The chips are supplied to the first quantitative let-off apparatus 120. This consists of a suction fan 12a, a transport pipe 12b, a cyclone 12c, a rotary feeder 12d, a stock bin 12e, a transport screw 12f and a measuring screw 12g.

Namely, chips are transported to the cyclone 12c though the transport pipe 12b by suction force of the suction fan 12a. Note, a belt conveyer can be applicable 10 instead of the transport pipe 12b.

Chips stored in the cyclone 12c are transported to the stock bin 12e by the rotary feeder 12d arranged at the bottom of the cyclone 12c.

Chips transported to the stock bin 12e are gathered to one side by the transport screw 12f arranged at the bottom of the stock bin 12e, and delivered to an apparatus for hydrolyzing by the measuring screw 12g.

This apparatus for hydrolyzing 130 consists of an upstream rotary feeder 131, a vessel 132 and a downstream rotary feeder 133.

The upstream rotary feeder 131 and the downstream rotary feeder 133 have same construction, and transport chips quantitatively. Namely, quantity of chips which are supplied from the upstream rotary feeder 131 to the vessel 132, or that which are delivered from the vessel 132 to the downstream rotary feeder 133 can be adjusted by the rotational speed of a rotor.

The vessel 132 is used for continuous hydrolyzing of the coating on the chips in steam while chips are transported from an inlet to an outlet by a screw.

Steam condition for hydrolyzing is not specified, but it is desirable to keep as high as possible while not liquefying the chips in order to reduce the time for hydrolyzing. It becomes impossible to transport liquefied chips with a screw.

Note, it is suitable that chips are hydrolyzed for 0.5–2 hours in steam at 160° C., if the synthetic resin is PP. An accelerator for hydrolyzing, such as an acid or an alkali may be added.

After hydrolyzing, each of chips has a hydrolyzed and powdered coating around it.

Chips transported to an outlet are delivered by concavity 13b (FIG. 2) of the downstream rotary feeder 133, and supplied to a dryer apparatus 140.

The dryer apparatus 140 consists of dry furnace 141, a rotary feeder 142, a bag filter 143 and suction fan 144.

In the dry furnace 141, several percent of moisture contained in hydrolyzed chips is reduced below about 0.1% by hot blast generated from a hot blast furnace (not shown). Wet air is sucked by the suction fan 144, and released to the outside air.

Note, the hydrolyzed and powdered coating is caught by the bug filter before being released to the air.

Superheated steam may be used to dry chips instead of a hot air blast.

In this case, an energy-saving can be accomplished by supplying steam which is released from the relief valves arranged on the vessel, and dehumidified and super-heated by a dehumidifier and superheater, because the hot blast stove can be omitted.

The chips stored at the bottom of the dry furnace 141 are delivered by the rotary feeder 142, and supplied to the second quantitative let-off apparatus 150.

This consists of a suction fan 15a, a transport pipe 15b, a cyclone 15c, a rotary feeder 15d, a stock bin 15e, a transport screw 15f and a measuring screw 15g similar to the first quantitative let-off apparatus 120. This apparatus supplies chips to a kneader 160.

The kneader 160 consists of a biaxial kneader 161 and a extruding die 162.

The biaxial kneader 161 kneads the hydrolyzed coating, the size thereof being smaller than twenty or thirty μm, into chips.

Kneaded chips are extruded from the extruding die 162 which has holes each thereof, for example, 3 mm diameter, and supplied to a pelletizing apparatus 170.

The pelletizing apparatus 170 consists of a water tank for cooling 171 and a cutter 172.

Extruded synthetic resin is cooled in the water tank 171 to solidify and extruded synthetic resin is cut by the cutter 172 into pellets.

Figure 2:
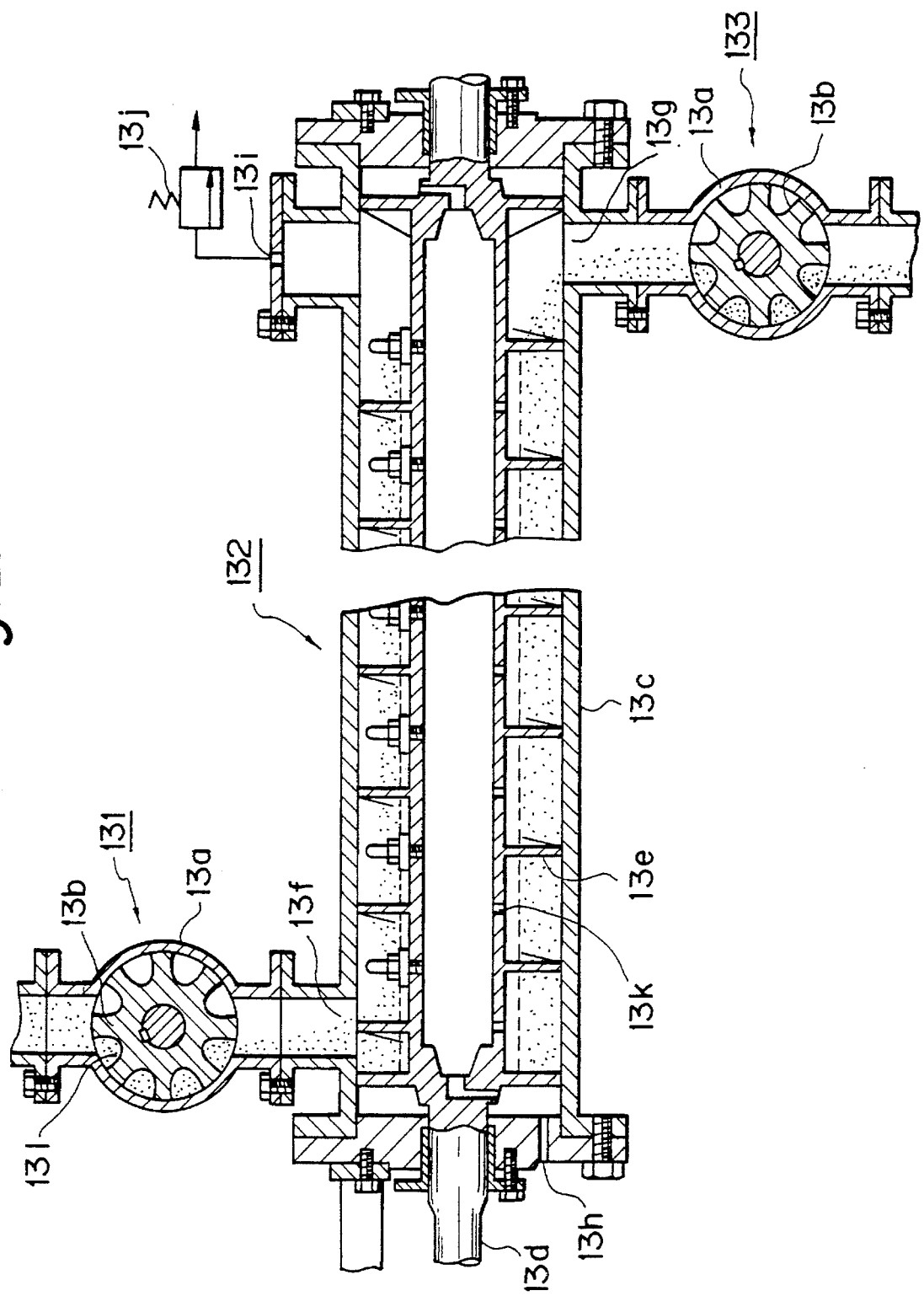
FIG. 2 is a sectional drawing of an apparatus for hydrolyzing.

FIG. 2 shows the cross sectional drawing of the hydrolysis apparatus 130.

Chips supplied from an inlet arranged at the top of the casing 13a of the upstream rotary feeder 131, are quantitatively transported to an outlet arranged at its bottom of it by concavity 13b made on the rotor driven by a motor.

The rotor 13b is arranged so as to touch the casing 13a, and it does not allow high-temperature and high-pressure steam to leak from the hydrolyzing vessel 132 to the first quantitative let-off apparatus 120 arranged at the upstream of the hydrolyzing vessel.

The vessel 132 has a hollow shaft 13d along the axis of the cylindrical casing 13c.

Around the hollow shaft 13d, a screw 13e is arranged so as to transport chips from the inlet 13f to the outlet 13g when the hollow shaft 13d is driven by a motor (not shown).

Further, around the hollow shaft 13d, plural exhaust nozzles are arranged. As steam supplied from a steam inlet 13h through the hollow shaft 13d is delivered therefrom, coating on the chips is continuously hydrolyzed and decomposed while chips are transported from the chip inlet 13f to the chip outlet 13g.

The temperature and pressure of the steam in the vessel 132 is controlled by the relief valve 13j connected to the steam outlet 13i.

Figure 3:
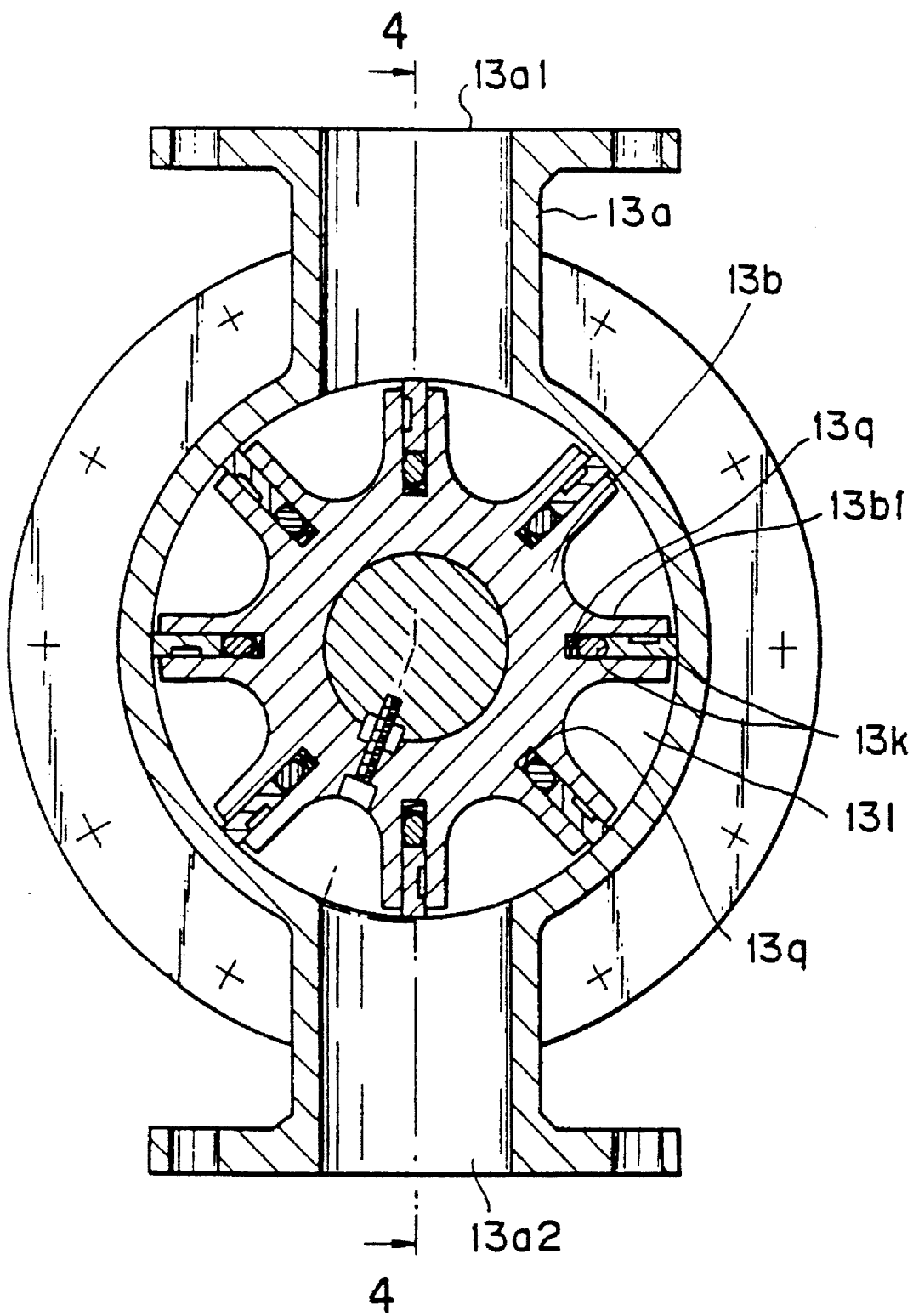
FIG. 3 is a sectional drawing perpendicular to the axis of the first embodiment of a rotary feeder.
Figure 4:
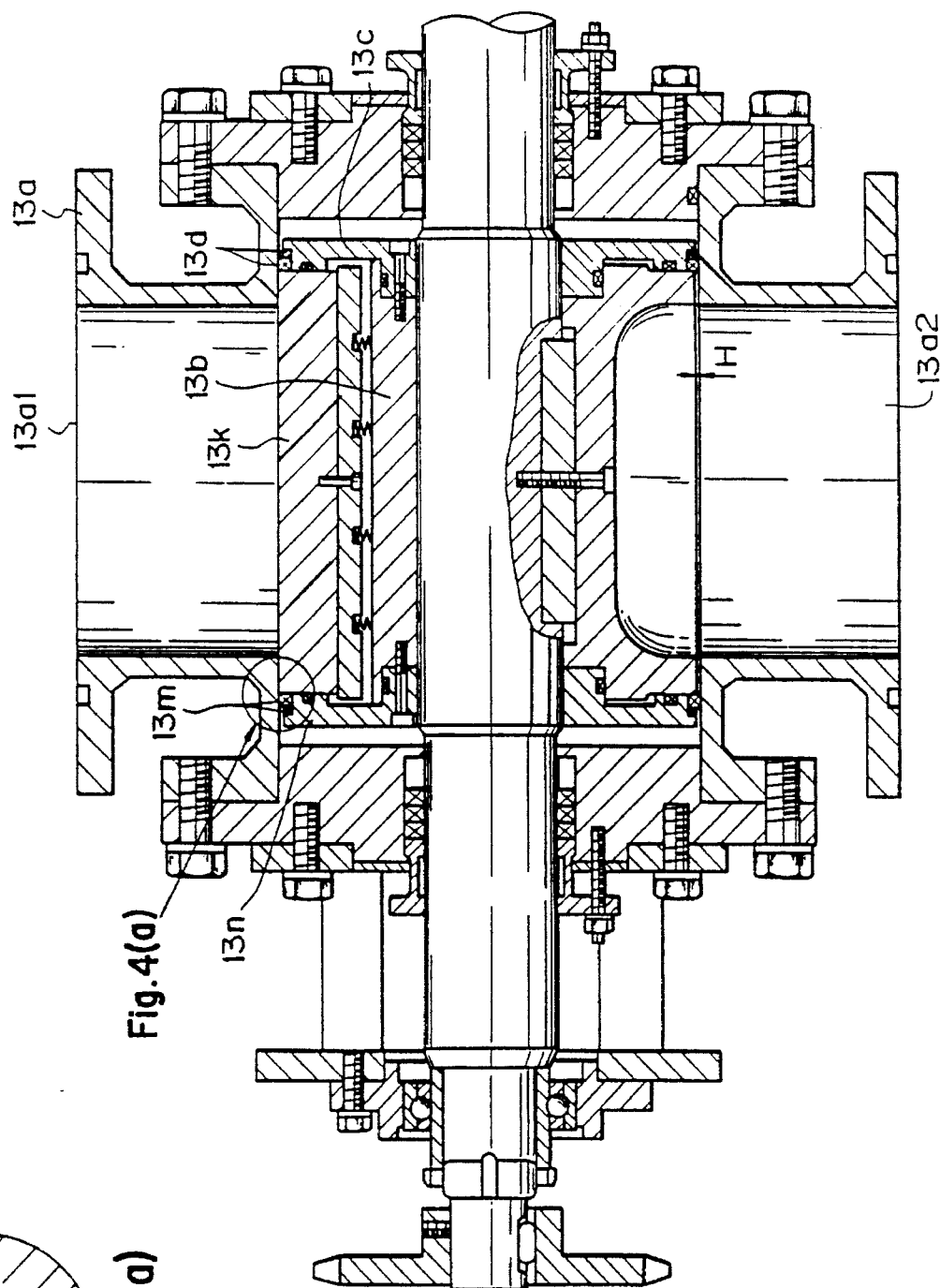
FIG. 4 is an axial structural drawing of the first embodiment.
Figure 4A:
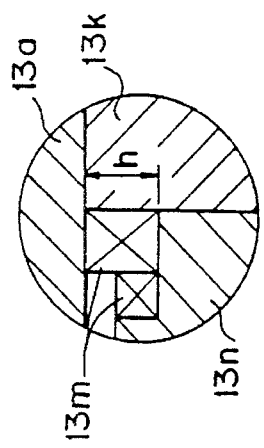

FIG. 3 shows a sectional drawing perpendicular to the axis of the first embodiment of a rotary feeder which is arranged at the upstream of the vessel or its downstream, and FIGS. 4 and 4(a) shows its axial sectional drawing. The rotary feeder consists of a cylindrical casing 13a having a chip inlet 13a1 at its top and a chip outlet 13a2 at its bottom, eight blades 13k, and a rotor 13b having eight baskets 13l. And at least three blades 13k are pressed against the inner wall of the casing 13a.

Figure 5:
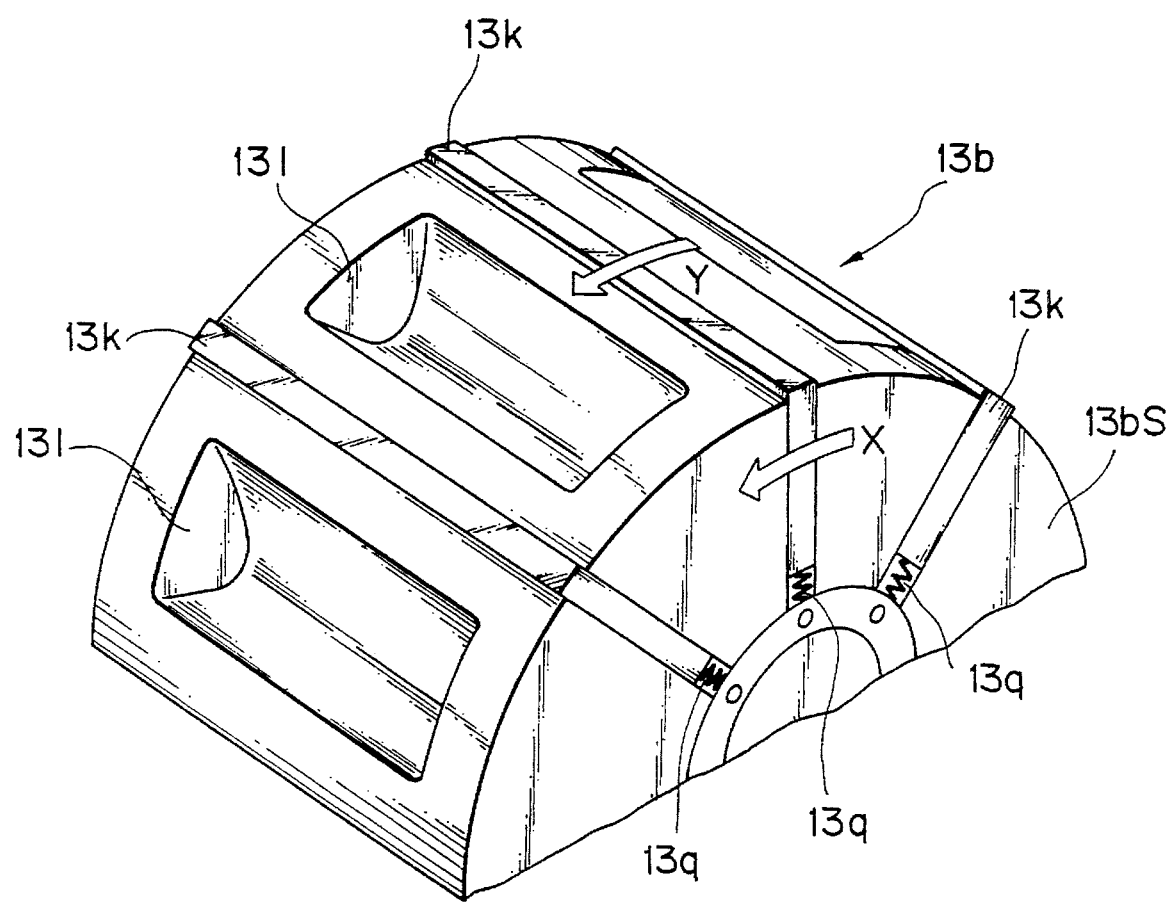
FIG. 5 is a view of a rotor of the sealed rotary feeder.

FIG. 5 shows a three-dimensional view of the rotor 13b with alternately arranged blades 13k and baskets 13l. Chips supplied from the chip inlet 13a1 are stored in the basket 13l, transported to the chip outlet 13a2, and delivered quantitatively from the chip outlet 13a2. Note, the axial length of the basket is equal to that of the chip inlet and the chip outlet in order to improve efficiency.

It is necessary to install a sealing mechanism on the side of the rotor (X in FIG. 5) and the circumference (Y in FIG. 5) of the rotor to seal between the upstream and the downstream of the seal rotary feeder.

To seal the side of the rotor 13b, sealant 13m is installed at the edge of the side plate 13n.

Further, to seal the circumference of the rotor, channels 13p, the same length as the rotor 13b, are cut on its circumference, and blades 13k and springs 13q are inserted into the channels. As the blades are pressed against the inner wall of the casing 13a by the springs 13q, steam flow around the circumference of rotor 13b is prevented. Note, the force of each spring 13q is set in order to keep the blades touching against the inner wall when high pressure is applied to the blades 13k. Note, the diameter of the rotor 13b is determined so as to have a clearance H between the casing 13a even when the casing 13a is deformed by thermal expansion.

It is necessary, furthermore, to stop steam flowing through the clearance between the blades 13k and channels 13p.

Figure 6:
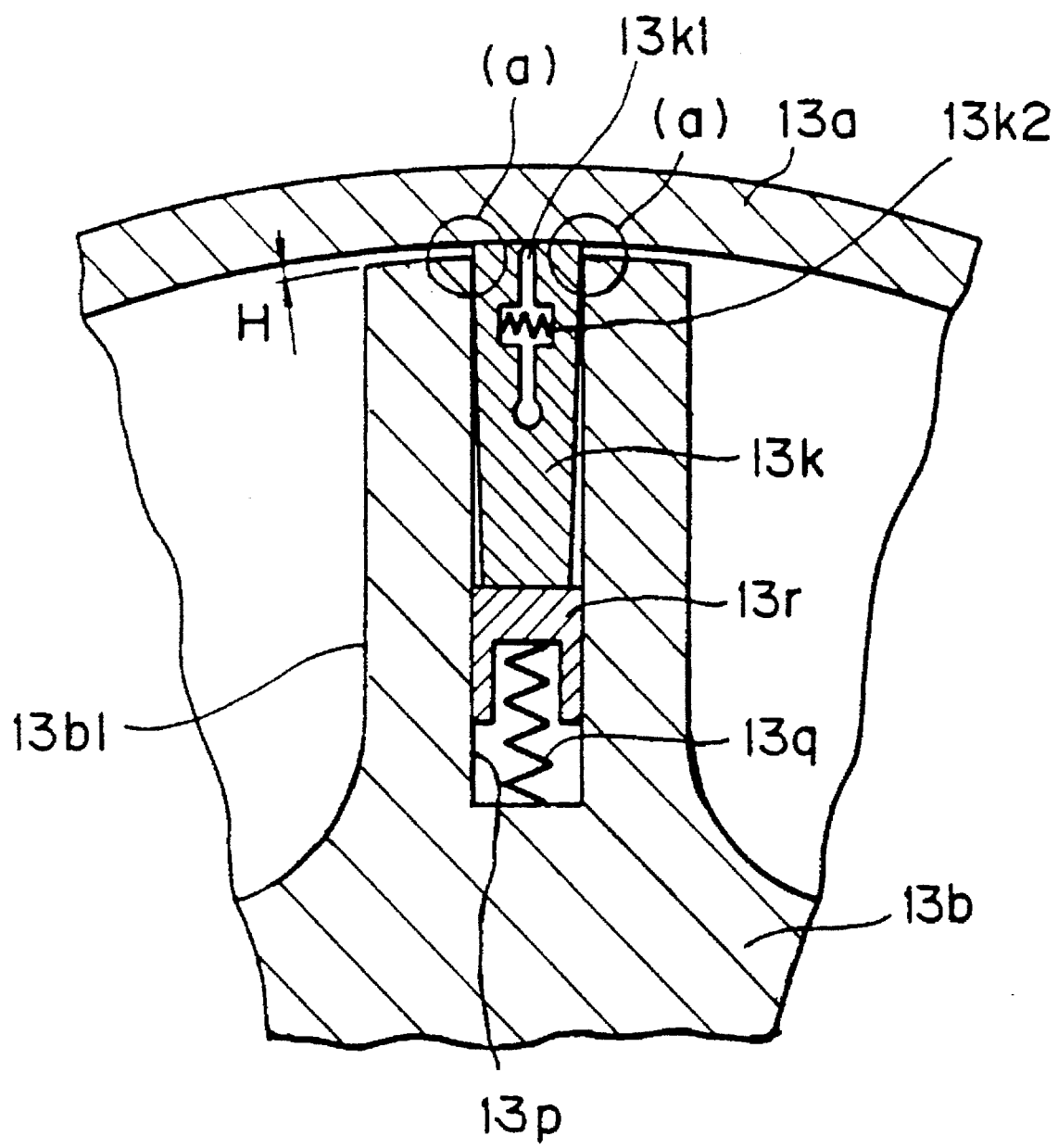
FIG. 6 is an enlarged sectional drawing of the first embodiment of a seal blade.

FIG. 6 shows the first method to stop steam flowing through the clearance (a) between the blades 13k and channels 13p. Blades 13k are supported by supporters 13r and movably installed.

At the bottom of the channels 13p, springs 13q are installed, and the blades 13k connected to the supporters 13r are pressed against the inner wall of the casing 13a.

Each blade 13k has a longitudinal slit 13k1 and a spring 13k2 in the slit 13k1 to spread it, and both sides of blade 13k touch to the channel 13p for sealing. Note, in FIG. 6 the spread of the blade is exaggerated.

Figure 7:
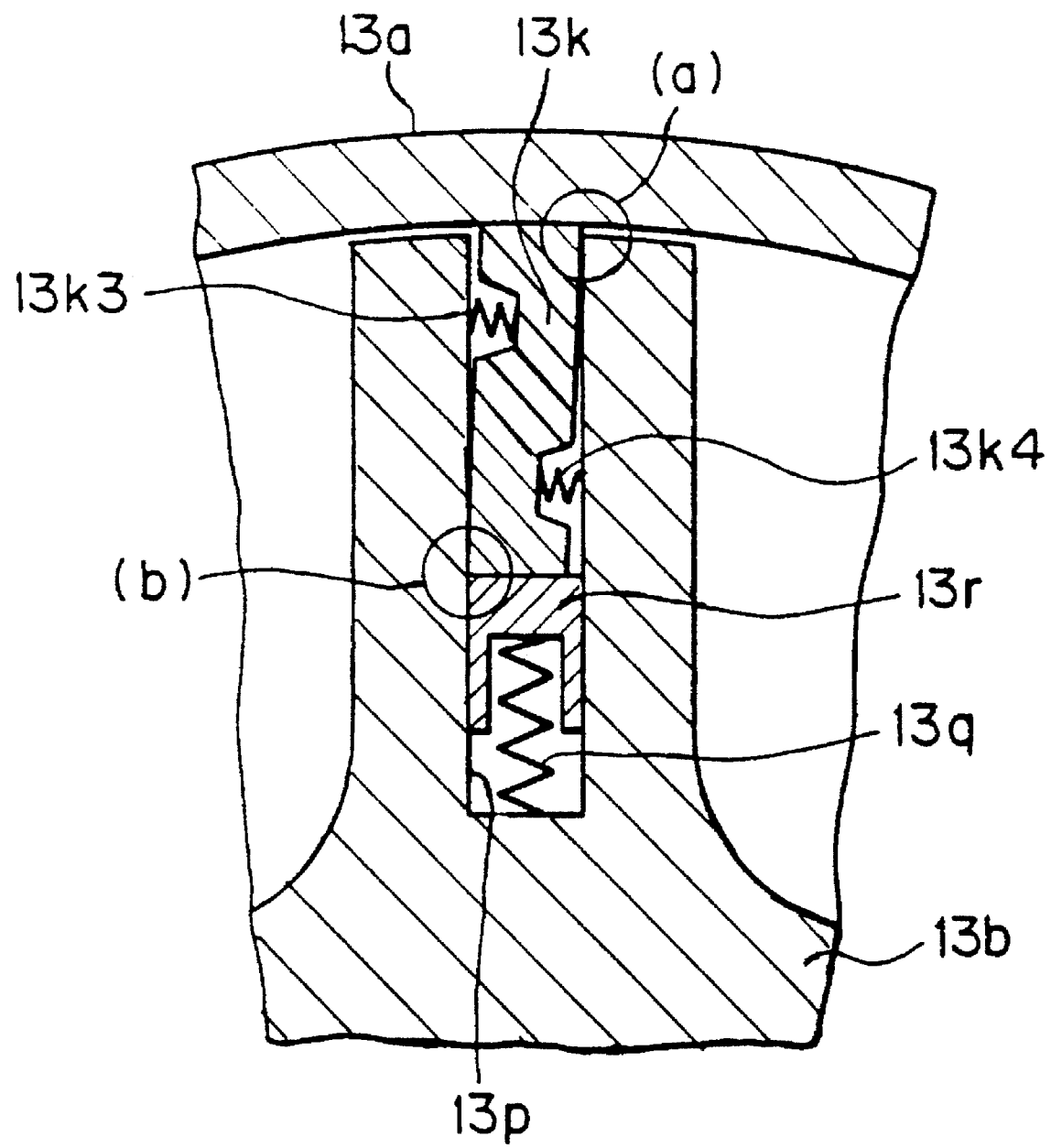
FIG. 7 is an enlarged sectional drawing of the second embodiment of a seal blade.

FIG. 7 shows the second method of sealing, where two springs 13k3 and 13k4 are arranged on both sides of each blade 13k so that the blade 13k is slanted in the channel 13p.

In the second method, each blade 13k is slanted by the two springs 13k3 and 13k4, and touch the top of the channel (a) and the inner wall of the channel (b). Note, in FIG. 7 the inclination of the blade is exaggerated.

Figure 8:
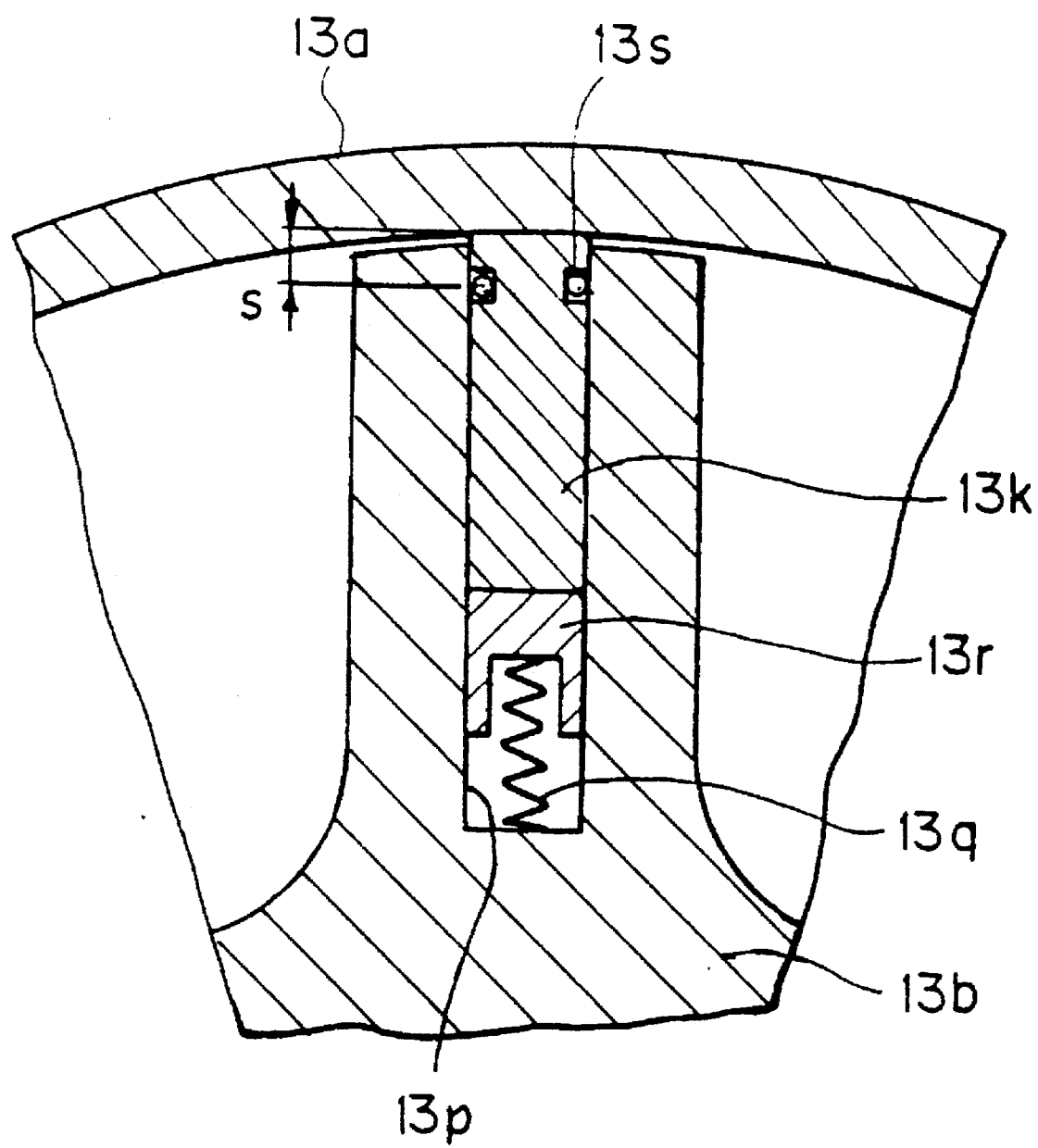
FIG. 8 is an enlarged sectional drawing of the third embodiment of a seal blade.

FIG. 8 shows the third method of sealing, where an O ring 13s is arranged around the blade 13k.

The distance s between the top of the blade 13k and the position where the O ring 13s is arranged must be smaller than the height h (see FIG. 4) simultaneously to seal steam flow at the side and the circumference of the rotor. The following equation must be satisfied.

$$s < h$$

Though the center of the blade 13k is not pressed against the inner wall of the casing 13a at the chip inlet 13a1 and the chip outlet 13a2, both sides of the blade 13k are always pressed against the inner wall of the casing 13a, and the wear of both sides is heavier than that of the center.

Figure 9A:
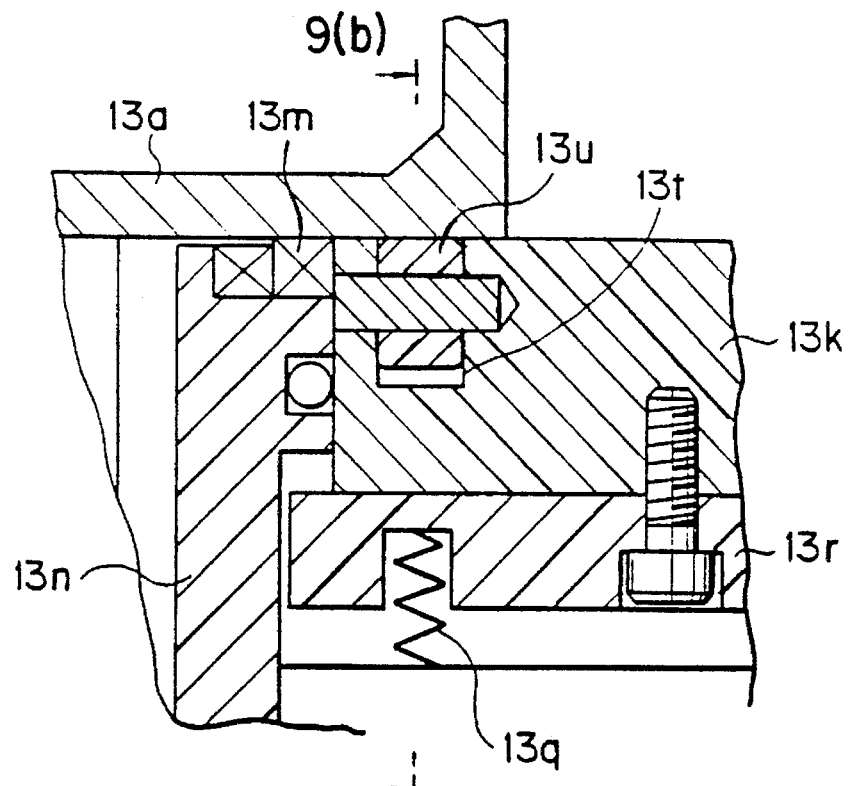
FIGS. 9(a) and 9(b) are structural drawing of the first embodiment of the seal rotary feeder.
Figure 9B:
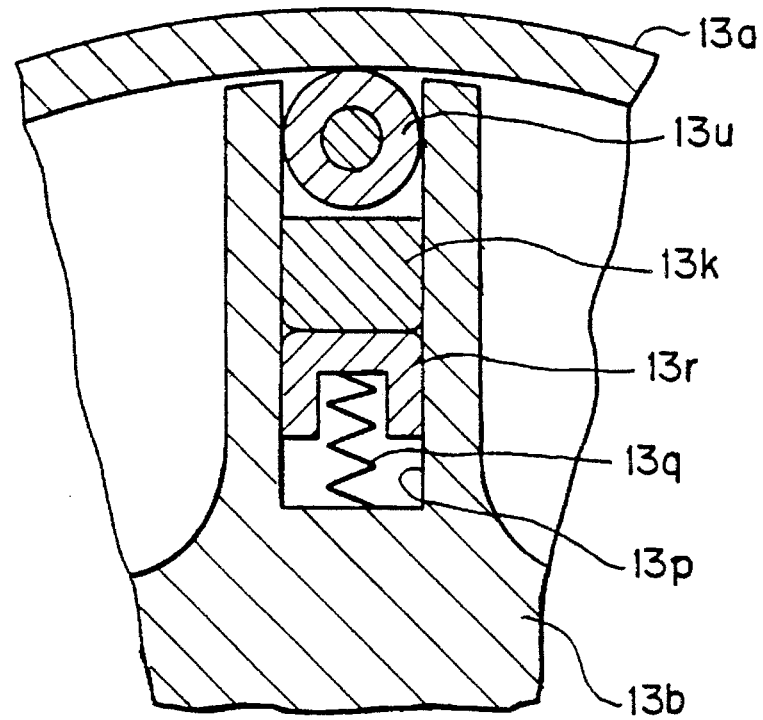

FIG. 9 shows the structural drawing to solve above-mentioned problem. Two cut-outs 13t are arranged at the both sides of the blade 13k and rollers 13u are installed.

It is possible that the wear on both side of the blade can be reduced by pressing the rollers 13u against the inner wall of the casing 13a.

To improve the sealing effect of the blades, it is necessary to increase the force against the inner wall of the casing on the high pressure side. On the other hand, to reduce the wear of the blades, it is necessary to reduce the force on the low pressure side.

FIG. 10 shows the sectional drawing of the second embodiment of the rotary feeder according to the present invention, and FIG. 11 shows a partial enlarged sectional drawing. The chip inlet 13a1 is the high pressure side and the chip outlet 13a2 is the low pressure side. Compressed air is introduced into the clearance 13p1 between the bottom of the channel 13p and the base of the blade 13k to increase the force on the blade 13k.

To achieve this, a side plate intake path 13n1 and a side plate exhaust path 13n2 are drilled on the side plate 13n. A casing intake path 13a3, a casing intake groove 13a4, a casing exhaust groove 13a5 and a casing exhaust path 13a6 are formed on the casing side plate 13a7. And an exhaust hole 13a8 is also drilled on the casing 13a.

At least 5 blades which are pressed against a lower part of the casing 13a, to which the chip outlet 13a2 belongs, are strongly pressed because compressed air supplied from an air source (not shown) is introduced the clearance 13p1 through the casing intake path 13a3, the casing intake groove 13a4 and the side plate intake path 13n1.

The remaining 3 blades which are pressed against an upper part of the casing 13a to which the chip inlet 13a2 belongs, are weakly pressed because compressed air introduced in the clearance 13p1 is exhausted through the side plate exhaust path 13n2, the casing exhaust groove 13a5, the casing exhaust path 13a6, a cavity 13a9 between the side plate 13n and the casing side plate 13a7, and the exhaust hole 13a8.

Wear of the blade 13k can be reduced, as only the force of the spring 13q acts upon the blade 13k.

Figure 12:
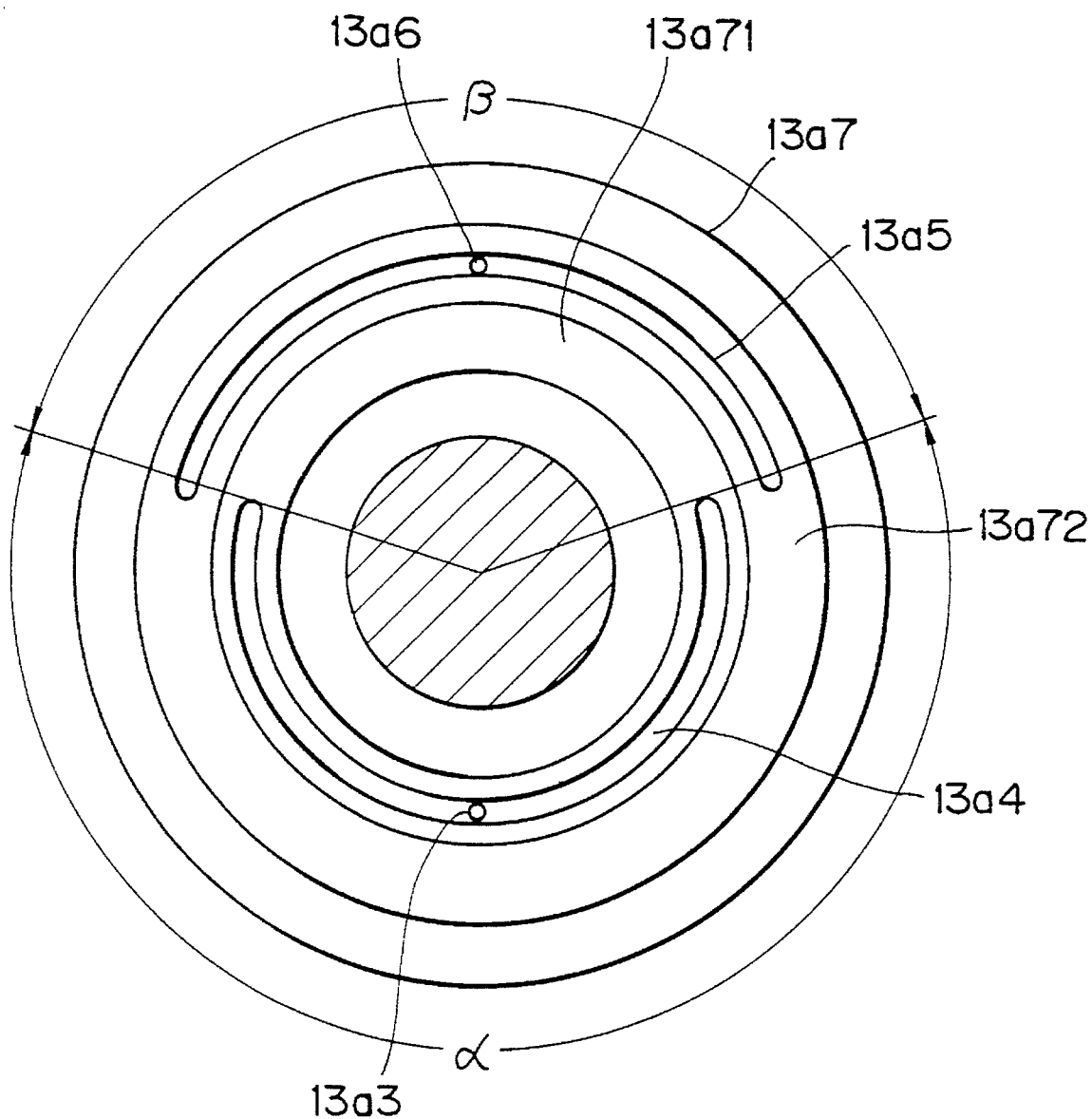
FIG. 12 is the first drawing of an inner surface of the side plate of the second embodiment.

FIG. 12 shows an inner plane of the casing side plate 13a7. On the inner surface of the casing side plate 13a7, two concentric seals 13a71 and 13a72 are embedded.

At the center of the inner seal 13a71, the side plate intake groove 13a4 is formed over one circular arc $\alpha$, and compressed air is supplied from the side plate intake path 13a3. The blades inside the circular arc $\alpha$, therefore, are strongly pressed against the inner wall of the casing by compressed air.

At the center of the outer sealant 13a72, the side plate exhaust groove 13a5 is formed over the other circular arc $\beta$, and compressed air is exhausted to the side plate exhaust path 13a6. The blades inside the second circular arc $\beta$, therefore, are pressed only by the spring 13p.

Figure 13:
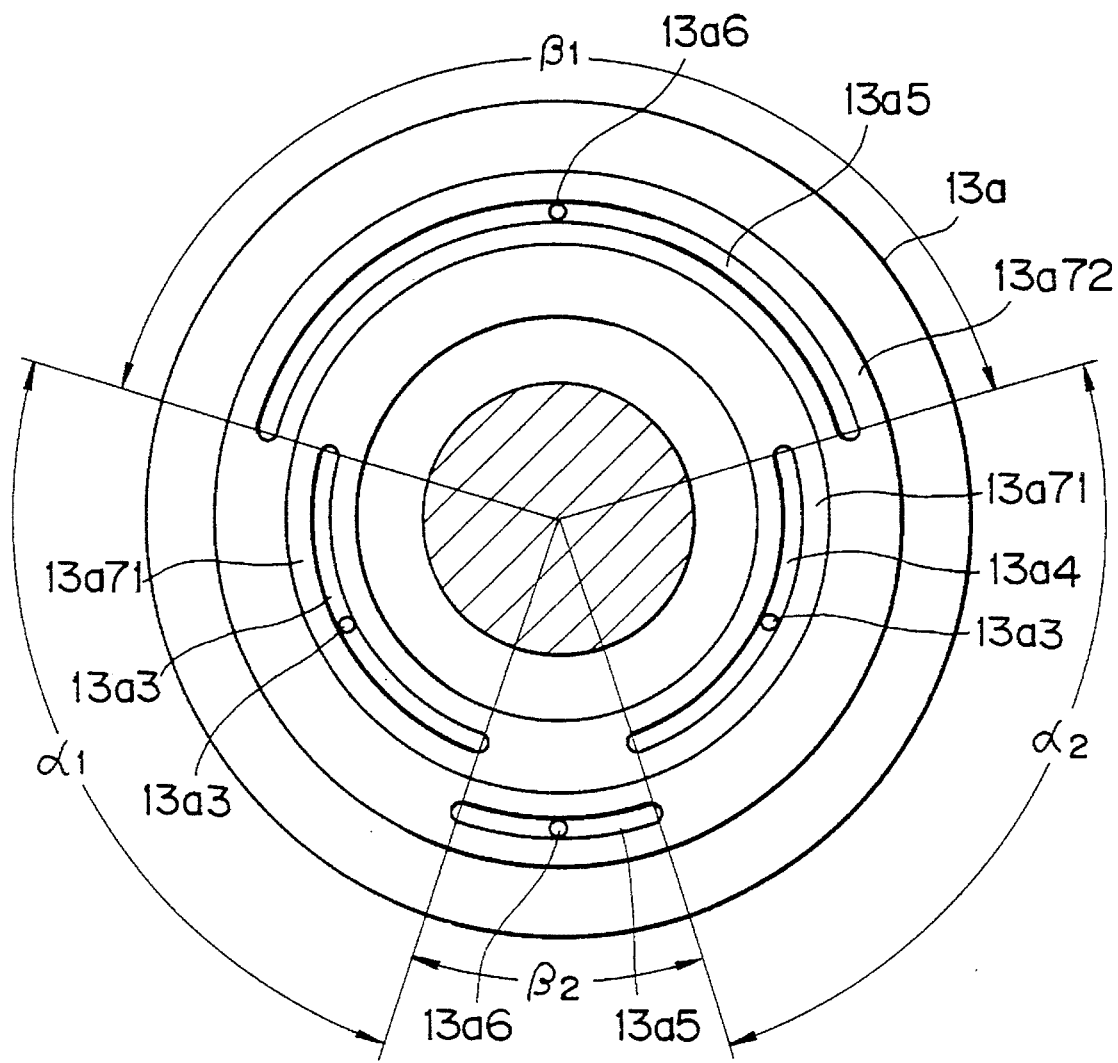
FIG. 13 is the second drawing of an inner surface of the side plate of the second embodiment.

FIG. 13 shows another inner plane of the casing side plate 13a7. At the middle of one circular arc $\alpha$, the second side plate exhaust groove 13a52 is arranged over a circular arc $\beta_2$. The circular arc $\beta_2$ corresponds to a range where the blades 13k exist on the chip outlet 13a2, and wear of the both sides of blades can be reduced by exhausting compressed air stored in the clearance 13p1 in this range. Note, in this case, the routes of the side plate intake path 13a3 and the side plate exhaust path 13a6 must be modified.

Figure 14:
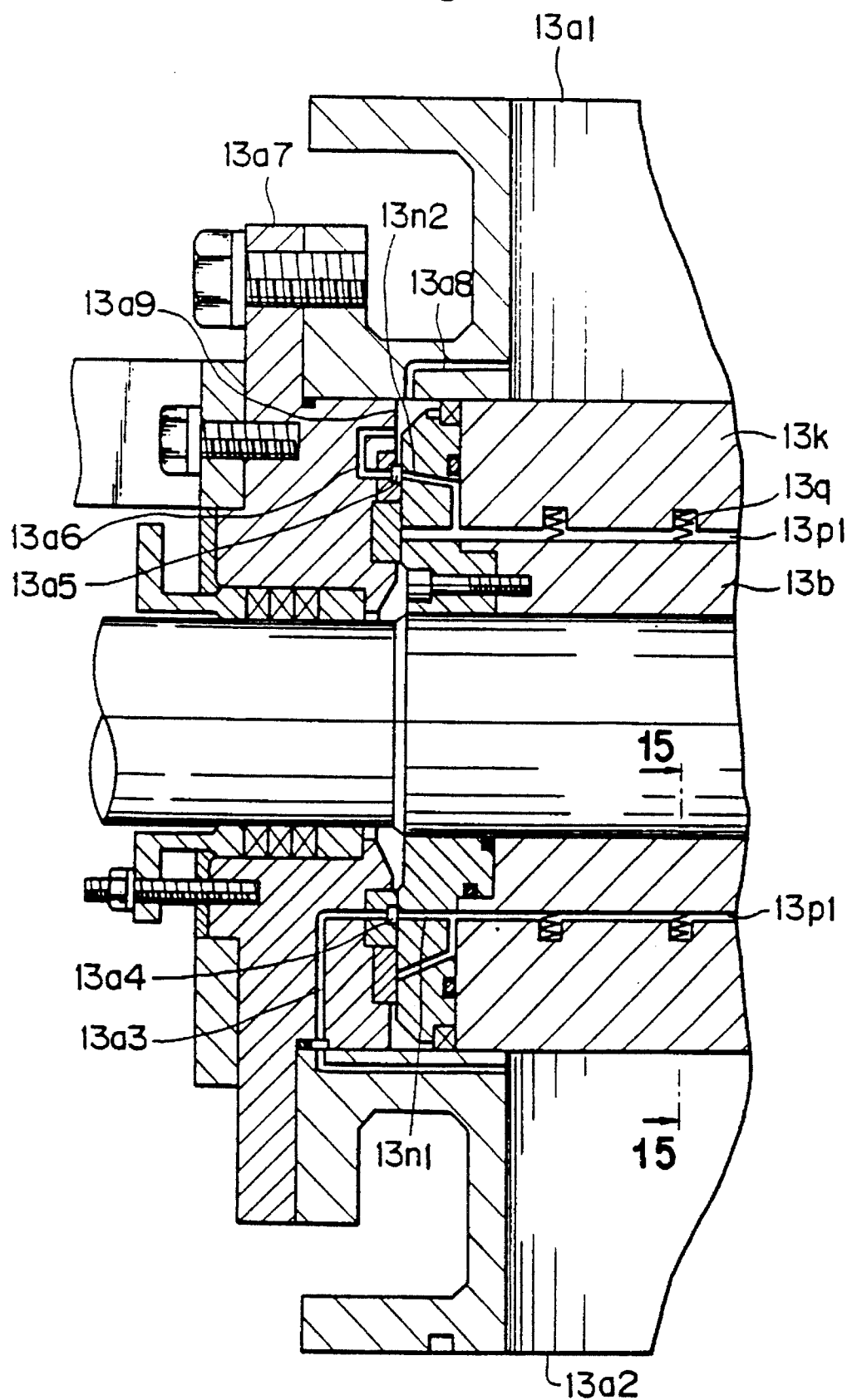
FIG. 14 is an enlarged sectional drawing of the third embodiment of the seal rotary feeder.

FIG. 14 shows the partial sectional drawing of the third embodiment, high pressure steam is used to press the blades 13k instead of compressed air. That is, the casing intake path 13a3 is opened to the chip outlet 13a2, and the casing exhaust hole is opened to the chip inlet 13a1.

High pressure steam at the chip outlet, therefore, is introduced to the clearance 13p1 though the casing intake path 13a3, the casing intake groove 13a4 and the side plate intake path 13n1. High pressure steam stored in the clearance 13p1 is exhausted to the chip inlet where steam pressure is low though the side plate exhaust path 13n2, the casing exhaust groove 13a5, the casing exhaust path 13a6, the cavity 13a9 and the casing exhaust hole 13a8.

Note, for the third embodiment, both casing side plates shown in FIGS. 12 and 13 may be applied.

Figure 15:
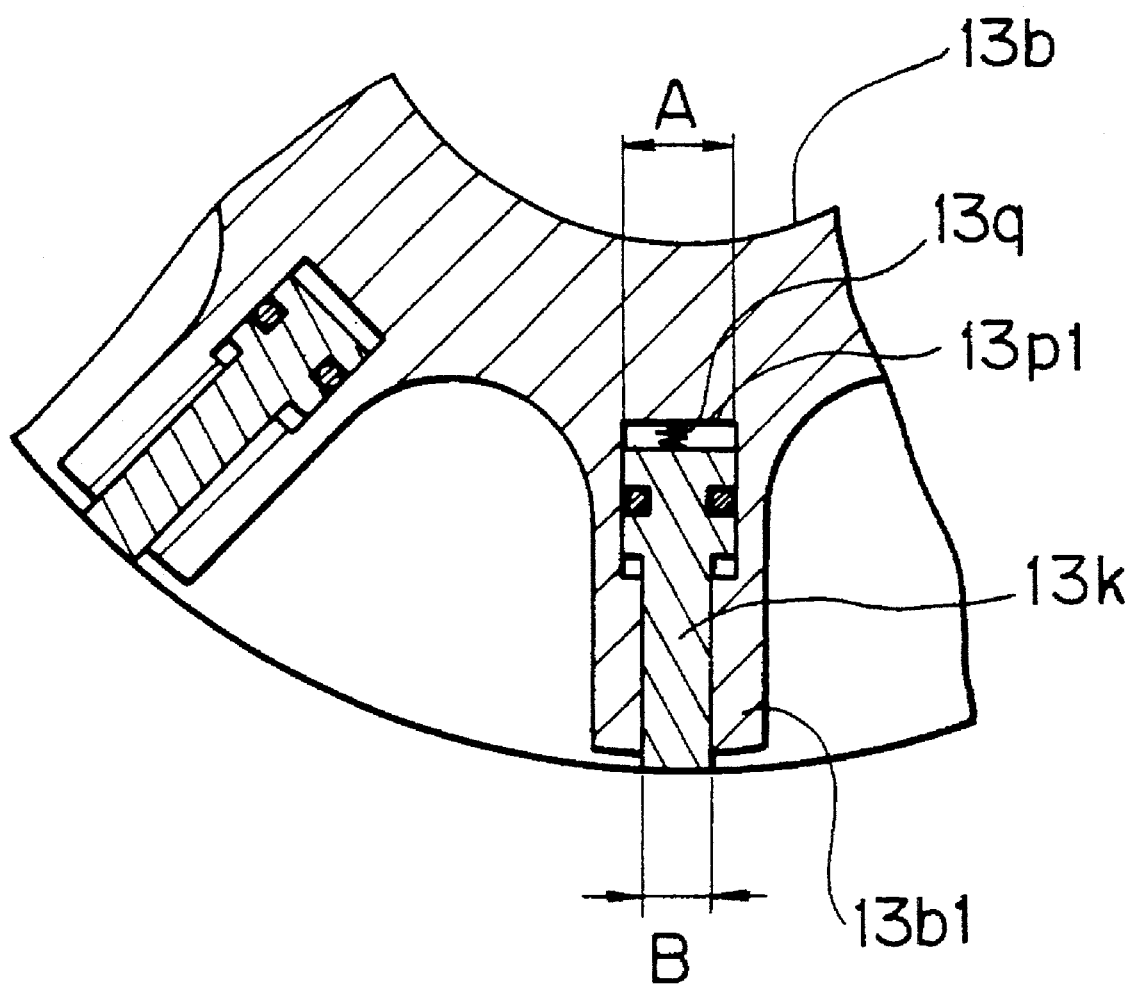
FIG. 15 is an enlarged sectional drawing of the third embodiment.

FIG. 15 shows the sectional drawing along 15—15 (in FIG. 14) of the third embodiment, the bottom width of the blade 13k A is determined larger than the top width B. Though steam in the chip outlet 13a2, therefore, is introduced, a force which acts on the bottom of the blade 13k is larger than that which acts on the top, and the blade 13k is strongly pressed against the inner surface of the casing 13a.

Figure 16:
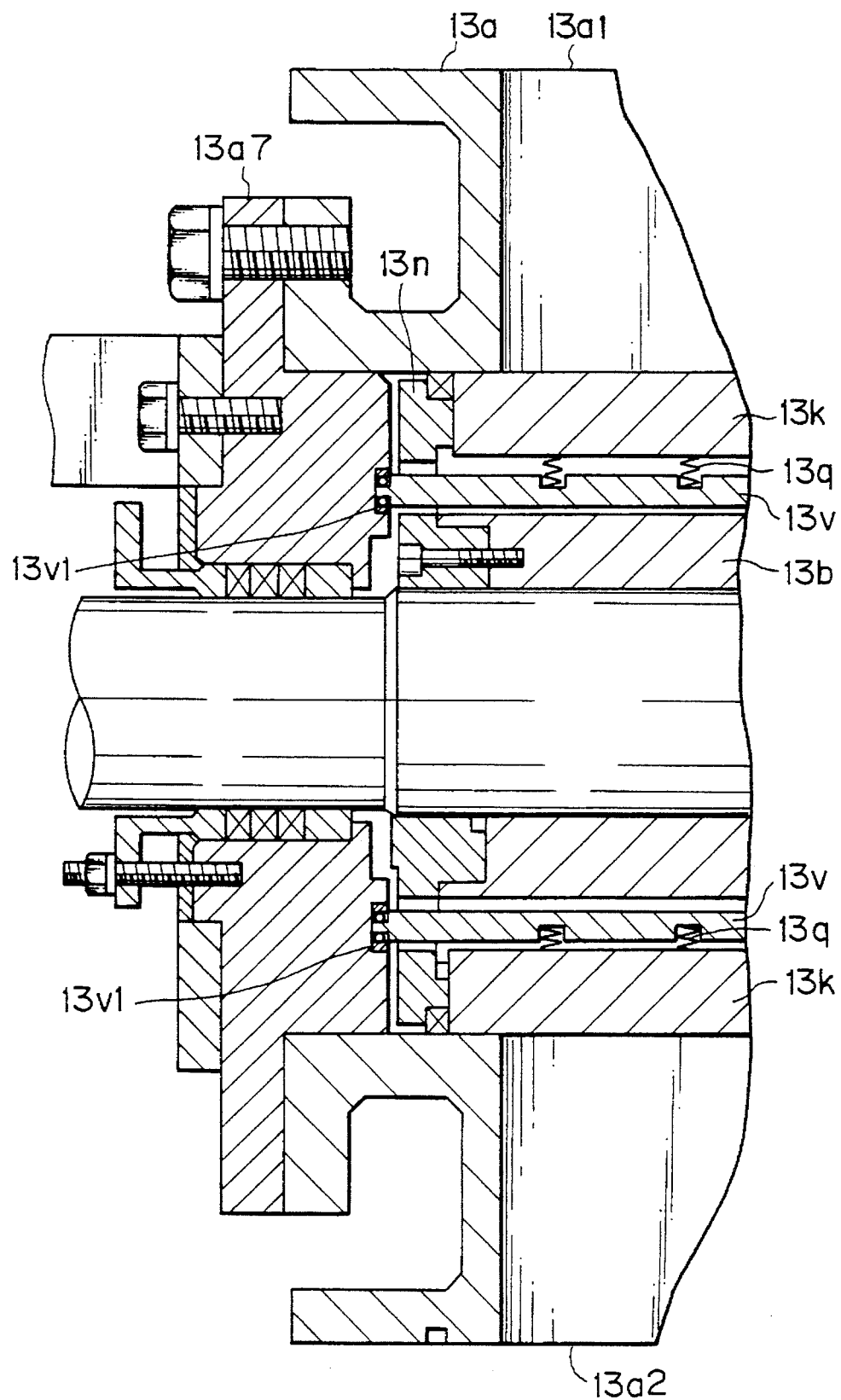
FIG. 16 is an enlarged sectional drawing of the fourth embodiment of the seal rotary feeder.

FIG. 16 shows the sectional drawing of the fourth embodiment, and a spring holder 13v is inserted at the bottom of each channel 13p. Springs 13q are fixed on the spring holder 13v, and the blade 13k is arranged on springs 13q.

The spring holder 13v extends through the side plates 13n, and a shoe 13v1 is arranged on the both sides of the spring holder 13v. Each shoe 13v1 is engaged with the shoe groove 13a71 which is formed on the casing side plate 13a7, and the spring holder 13v can radially be moved following the shoe groove 13a71.

Figure 17:
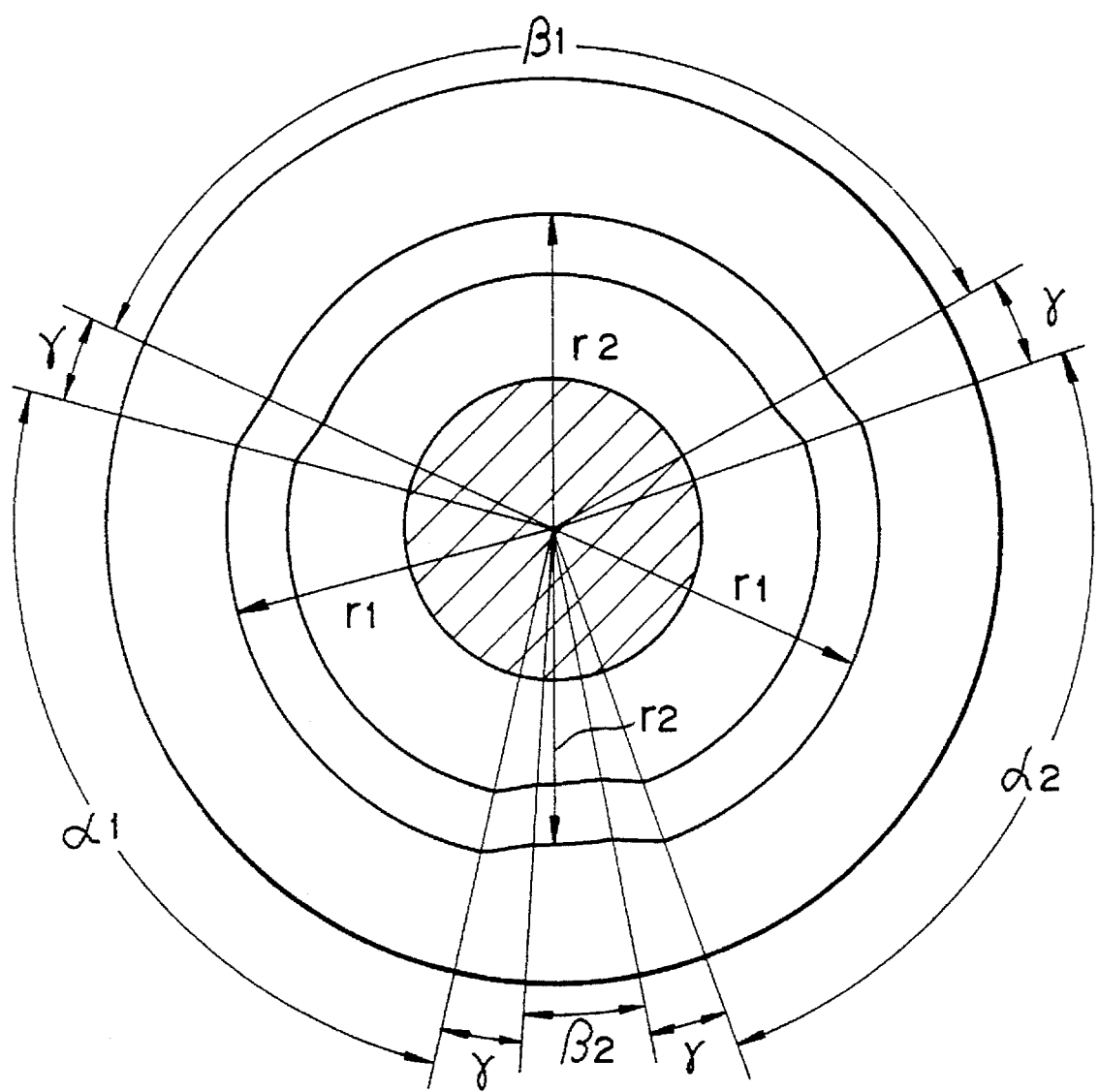
FIG. 17 is a drawing of an inner surface of the side plate of the fourth embodiment.

FIG. 17 shows the inner plane of the casing side plate 13a7. The outer radius of the shoe groove 13a71 is $r_1$ over the circular arc $\alpha_1$ and $\alpha_2$, and $r_2$ over the circular arc $\beta_1$ and $\beta_2$. And over each circular arc $\gamma$, the shoe groove 13a71 is formed so that the shoe groove 13a71 is smoothly connected.

Note, the following equation must be satisfied.

$$r_1 > r_2$$

Blades 13k which exist in the circular arc $\alpha_1$ and $\alpha_2$, are strongly pressed, because the spring holder 13v is moved to the outside, springs 13q are compressed and the blades are pressed by springs.

Blades 13k which exist in the circular arc $\beta_1$ and $\beta_2$, are weakly pressed, because the spring holder 13v is moved to the inside, and springs 13q are loosened.

Note, the reason for reducing a press force over the circular arc $\beta_2$ is reducing wear of the blades, and the roller groove over the circular arc $\beta_2$ can be deleted to simplify the structure.

The above embodiment is explained when the chip inlet 13a1 is low pressure side and the chip outlet 13a2 is high pressure side, but can be applied when the chip inlet 13a1 is high pressure side and the chip outlet 13a2 is low pressure side.

We claim:

1. A sealed rotary feeder, comprising a casing having an inner cylindrical surface and a chip inlet on one side of said casing and a chip outlet on another side of said casing, a rotor installed for rotation in said casing within said cylindrical surface, a plurality of channels radially formed around said rotor, a blade movably inserted into each of said plurality of channels, said blades and channels dividing said rotor into plural baskets, a clearance provided in each channel between said channel and its respective blade, at least one spring positioned in each such clearance, gas-introducing means for introducing compressed gas to said clearances from the chip inlet or chip outlet at the higher pressure, said compressed gas being introduced to each of said clearances in turn at a first predetermined position of said rotor during its rotation within said casing to increase the pressure on each respective blade during a first predetermined rotational arc of said rotor, gas-exhausting means for exhausting said compressed gas from said clearances to the chip inlet or chip outlet at the lower pressure, said compressed gas being exhausted from each of said clearances in turn at a second predetermined position of said rotor during its rotation within said casing to remove the increased pressure on each respective blade during a second predetermined rotational arc of said rotor.

2. A sealed rotary feeder as set forth in claim 1, wherein said gas-introducing means includes a casing side plate attached to said casing and a casing intake path and a casing intake groove formed in said casing side plate, and a side plate attached to said rotor and a side plate intake path formed in said side plate, and said gas-exhausting means includes a side plate exhaust path formed in said side plate, and a casing exhaust groove and a casing exhaust path formed in said casing side plate.

3. A sealed rotary feeder as set forth in claim 1, wherein said gas-introducing means includes a casing side plate, a casing intake path connected to said chip inlet or said chip outlet at the higher pressure, and a casing intake groove connected to said casing intake path, said casing intake path and intake groove formed in said casing side plate, and a side plate attached to said rotor and a side plate intake path formed in said side plate, said gas-exhausting means includes a side plate exhaust path formed in said side plate, and a casing exhaust groove and a casing exhaust path formed in said casing side plate, said casing exhaust path connecting said casing exhaust groove to said chip inlet or said chip outlet at the lower pressure.

4. A sealed rotary feeder, comprising a casing having an inner cylindrical surface, a chip inlet intersecting said cylindrical surface at one location and a chip outlet intersecting said cylindrical surface at a second location removed from said first location, and a rotor installed in said casing within said cylindrical surface, said rotor having plural walls which radially extend outwardly toward the inner cylindrical surface of said casing, a channel formed in the top of each of said plural walls, a blade movably positioned in each said channel, and a pressing means for pressing said blade against the inner cylindrical surface of said casing, each of said plural blades having a top surface which presses against the inner cylindrical surface, a slit extending inwardly from said top surface, and a spring in said slit which spreads its respective blade within its channel and seals the clearance between said blade and said channel.

* * * * *